United States Patent
Zhang et al.

(10) Patent No.: US 12,428,606 B2
(45) Date of Patent: Sep. 30, 2025

(54) METHOD FOR UPGRADING COAL SLIME THROUGH SYNERGISTIC DEHYDRATION

(71) Applicant: China University of Mining and Technology, Jiangsu (CN)

(72) Inventors: Bo Zhang, Jiangsu (CN); Yuemin Zhao, Jiangsu (CN); Xianliang Meng, Jiangsu (CN); Enhui Zhou, Jiangsu (CN); Zongsheng Sun, Jiangsu (CN)

(73) Assignee: China University of Mining and Technology, Jiangsu (CN)

( * ) Notice: Subject to any disclaimer, the term of this patent is extended or adjusted under 35 U.S.C. 154(b) by 0 days.

(21) Appl. No.: 18/784,697

(22) Filed: Jul. 25, 2024

(65) Prior Publication Data

US 2025/0171701 A1    May 29, 2025

(30) Foreign Application Priority Data

Nov. 29, 2023    (CN) .......................... 202311622121.5

(51) Int. Cl.
    *C10L 1/32*     (2006.01)
    *B01D 25/12*     (2006.01)
    *B03B 9/00*     (2006.01)
    *C02F 11/122*     (2019.01)

(52) U.S. Cl.
    CPC .............. *C10L 1/326* (2013.01); *B01D 25/12* (2013.01); *B03B 9/005* (2013.01); *C02F 11/122* (2013.01); *C10L 2290/08* (2013.01); *C10L 2290/148* (2013.01); *C10L 2290/546* (2013.01); *C10L 2290/547* (2013.01)

(58) Field of Classification Search
CPC ....... B01D 25/12; C03B 9/005; C02F 11/122; C10L 1/326; C10L 2290/08; C10L 2290/148; C10L 2290/546; C10L 2290/547
See application file for complete search history.

(56) References Cited

U.S. PATENT DOCUMENTS

2021/0094045 A1 *    4/2021    Gui .......................... B03B 7/00

FOREIGN PATENT DOCUMENTS

| CN | 102002412 B | * | 6/2013 | |
|---|---|---|---|---|
| CN | 215158528 U | * | 12/2021 | |
| CN | 116177843 A | * | 5/2023 | ............. C02F 11/13 |

OTHER PUBLICATIONS

English-language machine translation of CN 102002412 B (Year: 2013).*
English-language machine translation of CN 116177843 U (Year: 2023).*
English-language machine translation of CN 215258528 U (Year: 2021).*

(Continued)

*Primary Examiner* — James C Goloboy
(74) *Attorney, Agent, or Firm* — Procopio, Cory, Hargreaves & Savitch LLP

(57) ABSTRACT

Provided is a method for upgrading a coal slime through synergistic dehydration, including: subjecting coal slime water to be treated to filter pressing dehydration to obtain a filter cake; and crushing the filter cake, sieving and sizing, and subjecting a resulting oversize to steam transient dehydration to obtain a dehydrated coal slime.

7 Claims, 1 Drawing Sheet

(56) References Cited

OTHER PUBLICATIONS

Z. Sun, Y. Zhao, G. Yan, H. Yuan, M. Zhang, B. Zhang, "A novel method for low-rank coal drying using steam transient flash evaporation", Fuel, 2023, 254, 129238 (Year: 2023).*

X. Sun, X. Ma, Y. Fan, X. Dong, M. Chang, Z. Feng, D. Peng, "Insight into filter cake characteristics of fine coal tailings assisted by CPAM and α-HH during pressure filtration", Separation and Purification Technology, 2023, 326, 124822 (Year: 2023).*

* cited by examiner

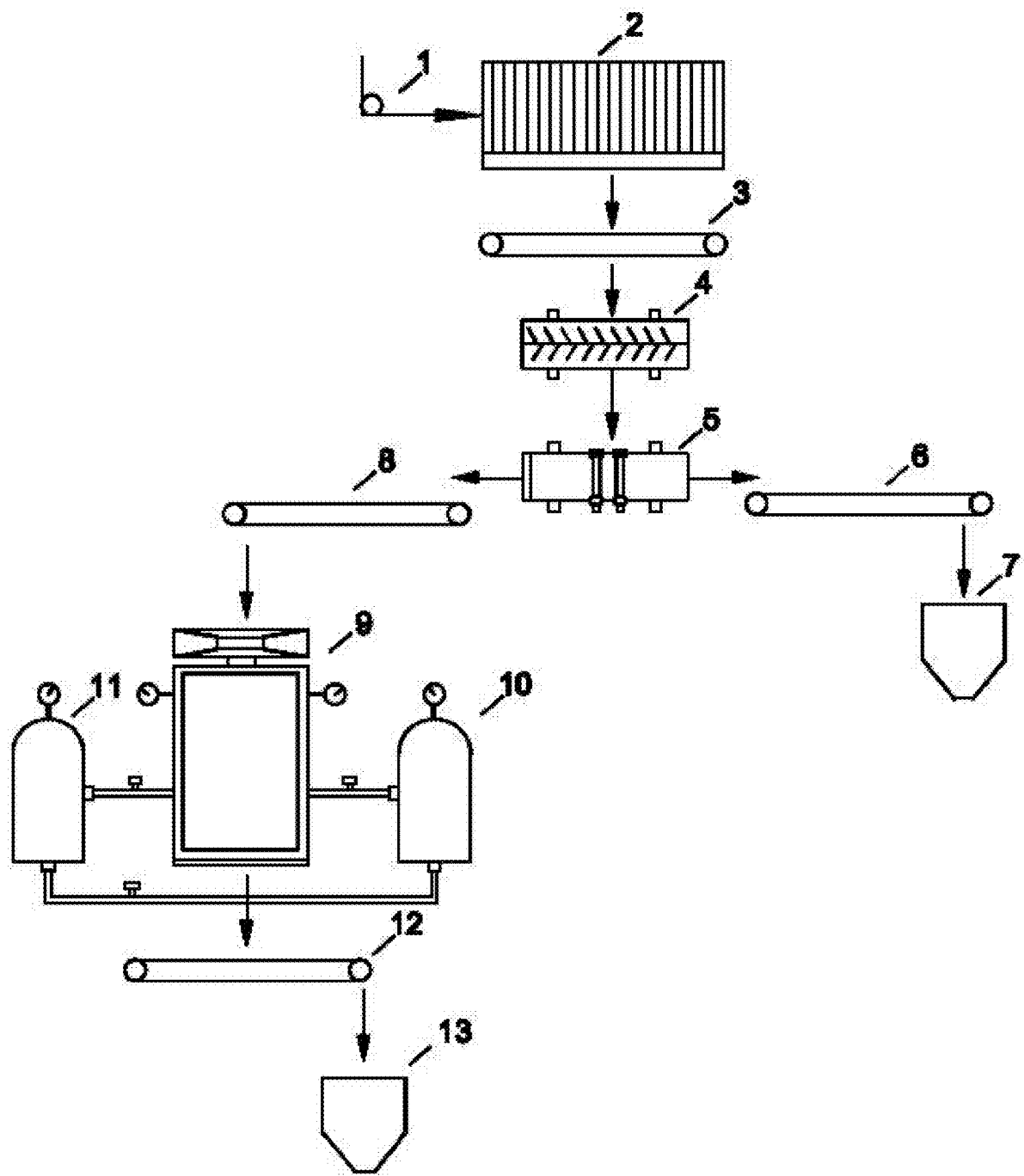

METHOD FOR UPGRADING COAL SLIME THROUGH SYNERGISTIC DEHYDRATION

CROSS REFERENCE TO RELATED APPLICATION

This patent application claims the benefit and priority of Chinese Patent Application No. 202311622121.5 filed with the China National Intellectual Property Administration on Nov. 29, 2023, the disclosure of which is incorporated by reference herein in its entirety as part of the present application.

TECHNICAL FIELD

The present disclosure relates to the technical field of coal slime dehydration, and in particular to a method for upgrading a coal slime through synergistic dehydration.

BACKGROUND

Coal is the main energy source in China. Coal needs to be sorted during processing to reduce the content of minerals and harmful impurities as much as possible. A main coal preparation method currently used in China is heavy medium wet coal preparation, in which water or an aqueous mixture is used as a separation medium, producing a large amount of coal slime water. The coal slime water is a suspension carrying a large amount of fine coal particles and other impurities, which can cause great harm to the waters when being directly discharged.

At present, the coal slime water is generally concentrated and dehydrated using mechanical dehydration equipment such as quick-opening filter press and plate and frame filter press, and then a resulting dehydrated coal slime is recycled. However, coal slime treated by this process still shows a high moisture content and a low calorific value, thus leading to a negative impact on storage, transportation, and sales of the coal slime.

SUMMARY

In view of this, the present disclosure provides a method for upgrading a coal slime through synergistic dehydration. The method has a high dehydration rate, and can effectively improve a calorific value of coal slime products, thereby increasing the utilization value of the coal slime products and overcoming the difficulties encountered in storage, transportation, and sales of the coal slime products.

To achieve the above object, the present disclosure provides the following technical solutions:

The present disclosure provides a method for upgrading a coal slime through synergistic dehydration, including the following steps:
  subjecting coal slime water to be treated to filter pressing dehydration to obtain a filter cake; and
  crushing the filter cake, sieving and sizing, and subjecting a resulting oversize to steam transient dehydration to obtain a dehydrated coal slime.

In some embodiments, the coal slime water to be treated has a coal slime concentration of 300 g/L to 500 g/L.

In some embodiments, the filter pressing dehydration is conducted at a pressure of 0.5 MPa to 10 MPa; and the filter cake has a moisture content of not greater than 25 wt %.

In some embodiments, a crushed material obtained after the crushing has a particle size of less than or equal to 50 mm.

In some embodiments, the sieving and sizing is conducted by dry sieving; and the sieving and sizing is conducted with a sieving size of 1 mm to 6 mm.

In some embodiments, the steam transient dehydration is conducted at a saturated steam temperature of 264° C. to 295° C. and a steam pressure of 5 MPa to 8 MPa for not greater than 5 min.

In some embodiments, the dehydrated coal slime has a moisture content of less than or equal to 15 wt %.

In some embodiments, the filter pressing dehydration is conducted by using a filter press;
  the coal slime water to be treated is sent into the filter press through a feeding pump;
  the crushing is conducted by using a crusher, and the filter cake obtained after the filter pressing dehydration is sent into the crusher through a first belt conveyor; and
  the sieving and sizing is conducted by using a sizing sieve, and an undersize obtained after the sieving and sizing is sent into a coal slime bin through a second belt conveyor for recycling.

In some embodiments, a system for the steam transient dehydration includes a steam dehydration system, a steam generation system, and a steam recovery system;
  the resulting oversize is sent into a dehydration chamber of the steam dehydration system through a third belt conveyor and then the dehydration chamber is sealed;
  saturated steam generated by the steam generation system is introduced into the dehydration chamber of the steam dehydration system, and pressure preservation is conducted after reaching a pressure of the steam transient dehydration;
  after the pressure preservation is completed, the saturated steam is released, and a released saturated steam is introduced into the steam recovery system for recycling; and
  the dehydrated coal slime is sent into a product bin through a fourth belt conveyor.

In some embodiments, the coal slime water to be treated is prepared by a process including:
  subjecting a high-water-content raw coal to wet sorting to obtain a primary coal slime water, and concentrating the primary coal slime water to obtain the coal slime water to be treated;
  wherein the high-water-content raw coal has a moisture content of greater than or equal to 30 wt %.

The present disclosure provides a method for upgrading a coal slime through synergistic dehydration, including the following steps: subjecting coal slime water to be treated to filter pressing dehydration (primary dehydration) to obtain a filter cake; and crushing the filter cake, sieving and sizing, and subjecting a resulting oversize to steam transient dehydration (secondary deep dehydration) to obtain a dehydrated coal slime. Mechanical dehydration alone can reduce the moisture content of dehydrated coal slime to about 20%, which cannot meet the moisture content requirement of specific products. The steam transient dehydration alone may result in a dehydration rate of about 50%, which cannot meet the moisture content requirement of products. The present disclosure combines filter pressing dehydration and steam transient dehydration, which can break through a lower limit of dehydration. Meanwhile, the filter pressing dehydration and the steam transient dehydration are conducted in sequence, which is beneficial to improving the drying efficiency of the steam transient dehydration. Moreover, a moisture removal rate of the steam transient dehydration is too low for slime particles with small particle sizes. First, the filter pressing dehydration is conducted to form small particles of coal slime into a filter cake, and the filter cake is then crushed and sieved, and a resulting oversize with a larger particle size is subjected to the steam transient dehydration, which helps to improve the dehydration effect of the steam transient dehydration. In addition, mechanical filter pressing dehydration can initially remove interstitial water from coal slime particles, which is beneficial to shortening a pressure-holding time of the subsequent steam transient dehydration and improving a processing capacity of the coal slime water as well as the continuity of processing. In summary, the method has a high dehydration rate, and can effectively improve a calorific value of coal slime products, thereby increasing the utilization value of the coal slime products and overcoming the difficulties encountered in storage, transportation, and sales of the coal slime products.

Furthermore, the method of the present disclosure can recycle the waste heat of steam after drying, is environmental-friendly, and has strong safety, large processing capacity, and high degree of automation.

The results of examples in the present disclosure show that after coal slime water undergoes primary filter pressing dehydration and secondary deep dehydration, a moisture content of the dehydrated coal slime is about 10% lower than that of a product obtained by single mechanical dehydration, and a calorific value of the dehydrated coal slime is about 2.5 MJ/kg higher than that of the product obtained by single mechanical dehydration.

BRIEF DESCRIPTION OF THE DRAWINGS

FIGURE shows a schematic structural diagram of a system used in the method for upgrading a coal slime through synergistic dehydration in an example of the present disclosure, where numeral references are: 1—feeding pump; 2—filter press; 3—first belt conveyor; 4—crusher; 5—sizing sieve; 6—second belt conveyor; 7—coal slime bin; 8—third belt conveyor; 9—steam dehydration system; 10—steam generation system; 11—steam recovery system; 12—fourth belt conveyor; and 13—product bin.

DETAILED DESCRIPTION OF THE EMBODIMENTS

The present disclosure provides a method for upgrading a coal slime through synergistic dehydration, including the following steps:

subjecting coal slime water to be treated to filter pressing dehydration to obtain a filter cake; and crushing the filter cake, sieving and sizing, and subjecting a resulting oversize to steam transient dehydration to obtain a dehydrated coal slime.

In the present disclosure, coal slime water to be treated is subjected to filter pressing dehydration to obtain a filter cake. In some embodiments of the present disclosure, the coal slime water to be treated is prepared by a process including: subjecting a high-water-content raw coal to wet sorting to obtain a primary coal slime water, and concentrating the primary coal slime water to obtain the coal slime water to be treated. In some embodiments of the present disclosure, the high-water-content raw coal has a moisture content of greater than or equal to 30 wt %, and preferably 30 wt % to 50 wt %. In some embodiments of the present disclosure, the coal slime water to be treated has a coal slime concentration of 300 g/L to 500 g/L, and preferably 350 g/L to 450 g/L.

In some embodiments of the present disclosure, the filter cake has a moisture content of no more than 25 wt %, and preferably 20% to 24%. In some embodiments of the present disclosure, the filter pressing dehydration is conducted at a pressure of 0.5 MPa to 10 MPa. In some embodiments of the present disclosure, the filter pressing dehydration is conducted by using a filter press, and the filter press is an ultra-high-pressure filter press or a quick-opening membrane filter press. In some embodiments, the ultra-high-pressure filter press has a cycle time of 45 min, and the quick-opening membrane filter press has a cycle time of 20 min. In a specific embodiment of the present disclosure, a type of the filter press is selected based on the moisture content of the coal slime water to be treated. In some embodiments, the coal slime water to be treated is fed into the filter press through a feeding pump. Specifically, the coal slime water to be treated is injected into a closed filter chamber of the filter press, and then formed into a filter cake with a certain mechanical strength by applying a pressure to the filter press.

In a specific embodiment of the present disclosure, the filter pressing dehydration includes low-pressure dehydration and high-pressure dehydration in sequence; the coal slime to be treated is formed into the filter cake at a low pressure, and then pressed at a high pressure to improve the dehydration efficiency. In some embodiments of the present disclosure, when using the ultra-high-pressure filter press for the filter pressing dehydration, the low-pressure dehydration is conducted at a pressure of 1.7 MPa to 1.9 MPa, and preferably 1.8 MPa, and the high-pressure dehydration is conducted at a pressure of 8 MPa to 10 MPa, and preferably 8.5 MPa; and when using the quick-opening membrane filter press for the filter press dehydration, the low-pressure dehydration is conducted at a pressure of 0.5 MPa to 0.6 MPa, and preferably 0.5 MPa, and the high-pressure dehydration is conducted at a pressure of 0.8 MPa to 1.0 MPa, and preferably 0.8 MPa.

In the present disclosure, the filter cake is crushed, and sieved and sized, and a resulting oversize is subjected to steam transient dehydration to obtain a dehydrated coal slime. In some embodiments of the present disclosure, a crushed material obtained after the crushing has a particle size of less than or equal to 50 mm, and preferably 6 mm to 50 mm. In some embodiments of the present disclosure, the crushing is conducted by using a crusher, and the filter cake obtained after the filter pressing dehydration is sent to the crusher through a belt conveyor (recorded as a first belt conveyor).

In some embodiments of the present disclosure, the sieving and sizing is conducted by dry sieving; the sieving and sizing is conducted with a sieving size of 1 mm to 6 mm, and preferably 1 mm or 3 mm; and the sieving and sizing is conducted by using a sizing sieve, and an undersize obtained after the sieving and sizing is sent into a coal slime bin through a belt conveyor (recorded as a second belt conveyor) for recycling. After the filter cake is subjected to sieving and sizing, a resulting oversize is subjected to steam transient dehydration. The resulting oversize is larger in size and has a certain porosity after being accumulated in a dehydration chamber of a steam dehydration system. The fluid convection and heat transfer effect between particle gaps is strong, which increases the drying efficiency. And, the larger void ratio of materials can reduce a water-holding capacity of the materials after drying.

In some embodiments of the present disclosure, the steam transient dehydration is conducted at a saturated steam temperature of 264° C. to 295° C., and preferably 270° C. to 290° C. and a steam pressure of 5 MPa to 8 MPa, and preferably 5.5 MPa to 7.5 MPa for not greater than 5 min, and preferably 1 min to 3 min. In some embodiments of the present disclosure, a system for the steam transient dehydration includes a steam dehydration system, a steam generation system, and a steam recovery system; and the resulting oversize is sent into a dehydration chamber of the steam dehydration system through a belt conveyor (recorded as a third belt conveyor) and then the dehydration chamber is sealed; saturated steam generated by the steam generation system is introduced into the dehydration chamber of the steam dehydration system, and pressure preservation is conducted after reaching a pressure of the steam transient dehydration; after the pressure preservation is completed, the saturated steam is released, and a released saturated steam is introduced into the steam recovery system for recycling; and the dehydrated coal slime is sent into a product bin through the belt conveyor. The system in the steam transient dehydration can control the amount of steam flowing into the dehydration chamber, and can monitor the pressure changes inside the dehydration chamber in real time and realize automatic control of the system.

In some embodiments of the present disclosure, the dehydrated coal slime is sent to a product bin through a belt conveyor (recorded as a fourth belt conveyor).

In some embodiments of the present disclosure, the dehydrated coal slime has a moisture content of less than or equal to 15 wt %, preferably less than or equal to 13 wt %, and more preferably 9 wt % to 13 wt %.

FIGURE shows a schematic structural diagram of a system used in the method for upgrading a coal slime through synergistic dehydration in an example of the present disclosure, where numeral references are: 1—feeding pump; 2—filter press; 3—first belt conveyor; 4—crusher; 5—sizing sieve; 6—second belt conveyor; 7—coal slime bin; 8—third belt conveyor; 9—steam dehydration system; 10—steam generation system; 11—steam recovery system; 12—fourth belt conveyor; and 13—product bin.

The technical solutions of the present disclosure will be clearly and completely described below in conjunction with specific examples of the present disclosure. Obviously, the described examples are only a part of, not all of, the examples of the present disclosure. All other embodiments obtained by those skilled in the art based on the embodiments of the present disclosure without inventive labour shall fall within the scope of the present disclosure.

Example 1

A filter press used in this example was an ultra-high-pressure filter press.

Raw coal has a moisture content of 40 wt %. The raw coal was subjected to wet sorting to obtain primary coal slime water. The primary coal slime water was concentrated in a concentration tank to obtain a concentrated coal slime water with a concentration of 400 g/L. The concentrated coal slime water was treated as follows, and a target moisture content of a dehydrated coal slime product was 13 wt %:

The concentrated coal slime water was fed into the ultra-high-pressure filter press 2 through a feeding pump 1. After the concentrated coal slime water was injected into a closed filter chamber, the concentrated coal slime water was formed into a filter cake at a pressure of 1.8 MPa. The filter cake was subjected to secondary pressing dehydration at a high pressure of 8.5 MPa. At this time, the filter cake obtained after dehydration had a moisture content of 23 wt %. The filter cake was unloaded and fed into a 50 mm crusher 4 through a first belt conveyor 3 and crushed. A resulting crushed material was introduced into a 3 mm sizing sieve 5; a resulting undersize was transported to a coal slime bin 7 through a second belt conveyor 6, and a resulting oversize was fed into a dehydration chamber of a steam dehydration system 9 through a third belt conveyor 8. Saturated steam generated by a steam generation system 10 flowed into the dehydration chamber. Materials larger than 3 mm were accumulated in the dehydration chamber, and a void ratio thereof was about 50%. The fluid convection and heat transfer effect between particle gaps is strong, which increases the drying efficiency. Moreover, the larger void ratio of the materials could reduce the water-holding capacity of the materials after drying. Pressure preservation was conducted at 7.5 MPa and 290° C. for 5 min, and then steam was quickly released, and secondary deep dehydration was completed. At this time, a moisture content of the dehydrated coal slime product is 12 wt %, and the calorific value is 2.76 KJ/Kg higher than that of a press filtering coal slime. A coal slime product was unloaded and transported to a product bin 13 through a fourth belt conveyor 12, and a released steam was introduced into a steam recovery system 11 for recycling.

Example 2

A filter press used in this example was a quick-opening membrane filter press.

Raw coal has a moisture content of 30 wt %. The raw coal was subjected to wet sorting to obtain primary coal slime water. The primary coal slime water was concentrated in a concentration tank to obtain a concentrated coal slime water with a concentration of 420 g/L. The concentrated coal slime water was treated as follows, and a target moisture content of a dehydrated coal slime product was 15 wt %:

The concentrated coal slime water was fed into the quick-opening membrane filter press 2 through a feeding pump 1. After the concentrated coal slime water was injected into a closed filter chamber of the quick-opening membrane filter press through the feeding pump, the concentrated coal slime water was formed into a filter cake by continuing to spray and lose pressure at 0.5 MPa. The filter cake was then subjected to secondary pressing dehydration under the action of 0.8 MPa high-pressure wind. After dehydration was completed, the filter cake had a moisture content of 24 wt %. The filter cake was unloaded and fed into a filter cake crusher 4 through a first belt conveyor 3 and crushed. A resulting crushed material was fed into a 1 mm sizing sieve 5; a resulting undersize was transported to a coal slime bin 7 through a second belt conveyor 6, and a resulting oversize was fed into a dehydration chamber of a steam dehydration system 9 through a third belt conveyor 8. Saturated steam generated by a steam generation system 10 flowed into the dehydration chamber. Pressure preservation was conducted at 5.5 MPa and 270° C. for 3 min, and then steam was quickly released, and secondary deep dehydration was completed. At this time, a moisture content of the dehydrated coal slime product is 13 wt %, and the calorific value is 2.76 KJ/Kg higher than that of a press filtering coal slime. A coal slime product was unloaded and transported to a product bin 13 through a fourth belt conveyor 12, and a released steam was introduced into a steam recovery system 11 for recycling.

The above descriptions are merely preferred embodiments of the present disclosure. It should be noted that a person of ordinary skill in the art may further make several improvements and modifications without departing from the principle of the present disclosure, but such improvements and modifications should be deemed as falling within the scope of the present disclosure.

What is claimed is:

1. A method for upgrading a coal slime through synergistic dehydration, comprising:

subjecting coal slime water to be treated to filter pressing dehydration to obtain a filter cake; and crushing the filter cake, sieving and sizing, and subjecting a resulting oversize to steam transient dehydration to obtain a dehydrated coal slime, wherein:

the filter pressing dehydration is conducted by using a filter press, and the coal slime water to be treated is sent into the filter press through a feeding pump;

the crushing is conducted by using a crusher, and the filter cake obtained after the filter pressing dehydration is sent into the crusher through a first belt conveyor;

the sieving and sizing is conducted by using a sizing sieve, and an undersize obtained after the sieving and sizing is sent into a coal slime bin through a second belt conveyor for recycling;

the steam transient dehydration is conducted at a saturated steam temperature of 264° C. to 295° C. and a steam pressure of 5 MPa to 8 MPa for not greater than 5 min;

the steam transient dehydration is conducted in a system comprising a steam dehydration system, a steam generation system, and a steam recovery system;

the resulting oversize is sent into a dehydration chamber of the steam dehydration system through a third belt conveyor and then the dehydration chamber is sealed;

saturated steam generated by the steam generation system is introduced into the dehydration chamber of the steam dehydration system, and pressure preservation is conducted after reaching a pressure of the steam transient dehydration;

after the pressure preservation is completed, the saturated steam is released, and a released saturated steam is introduced into the steam recovery system for recycling; and the dehydrated coal slime is sent into a product bin through a fourth belt conveyor.

2. The method according to claim 1, wherein the coal slime water to be treated has a coal slime concentration of 300 g/L to 500 g/L.

3. The method according to claim 1, wherein the filter pressing dehydration is conducted at a pressure of 0.5 MPa to 10 MPa; and the filter cake has a moisture content of not greater than 25 wt %.

4. The method according to claim 1, wherein a crushed material obtained after the crushing has a particle size of less than or equal to 50 mm.

5. The method according to claim 1, wherein the sieving and sizing is conducted by dry sieving; and the sieving and sizing is conducted with a sieving size of 1 mm to 6 mm.

6. The method according to claim 1, wherein the dehydrated coal slime has a moisture content of less than or equal to 15 wt %.

7. The method according to claim 1, wherein the coal slime water to be treated is prepared by a process comprising:

subjecting a high-water-content raw coal to wet sorting to obtain a primary coal slime water, and concentrating the primary coal slime water to obtain the coal slime water to be treated;

wherein the high-water-content raw coal has a moisture content of greater than or equal to 30 wt %.

* * * * *